Oct. 11, 1932.  C. G. OLSON  1,882,089

LOCK WASHER

Filed Sept. 2, 1930

Inventor:
Carl G. Olson
By Cheever, Cox & Moore
Attys

Patented Oct. 11, 1932

1,882,089

UNITED STATES PATENT OFFICE

CARL G. OLSON, OF CHICAGO, ILLINOIS, ASSIGNOR TO SHAKEPROOF LOCK WASHER COMPANY, OF CHICAGO, ILLINOIS, A CORPORATION OF DELAWARE

LOCK WASHER

Application filed September 2, 1930. Serial No. 479,174.

My invention relates generally to lock washers and particularly to lock washers adapted to be used with wood screws.

It is one of the objects of my present invention to provide a lock washer of the pronged type which is particularly adaptable for use with the head of wood screws and the like, and to this end I propose to provide a washer having internal teeth for lockingly engaging a screw head and external teeth adapted to imbed themselves within the outer surface of a work piece.

More specifically, my invention contemplates the provision of a flat type lock washer having internal annularly disposed teeth for lockingly engaging the underside of a screw head and prongs extending laterally of the washer body along the outer margin thereof which are adapted to imbed themselves within the surface of the work piece when a clamping force is applied axially of the washer.

A further object of my invention is to provide a washer, as above set forth, which, in addition to the internal teeth for engaging the screw head and the external teeth for engaging the work piece, is also provided with marginal prongs extending in a direction opposite to the prongs for engaging the work piece, whereby to enable said washer to be conveniently secured in position upon the screw head.

Still another object of my present invention is to provide a screw and lock washer assembly of improved practical construction in which the washer is secured in position upon the screw head by means of external prongs, which prongs are adapted to be bent over the head of the screw and thereby prevent axial displacement of the washer with respect to the screw body.

Another object of my invention is to provide a lock washer, as above set forth, which is so designed that either side thereof may be applied to the screw head, thereby greatly facilitating the ease with which said washers may be assembled with companion screws.

The foregoing and other objects and advantages will be more apparent from the following detailed description when considered in connection with the accompanying drawing, wherein.

My present invention is related to subject matter set forth in my copending application, Serial Number 479,173, filed of even date herewith wherein I have disclosed a conical type of lock washer adapted to be used with wood screws and the like. My present application, however, relates more particularly to flat type lock washers which may be used with wood screws.

Figure 1:
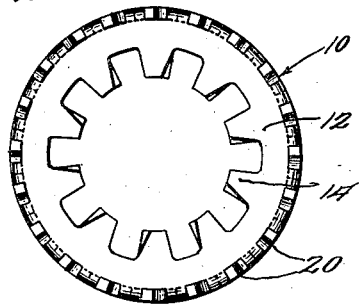
Figure 1 is a plan view of a lock washer constructed in accordance with the teachings of my present invention.
Figure 2:
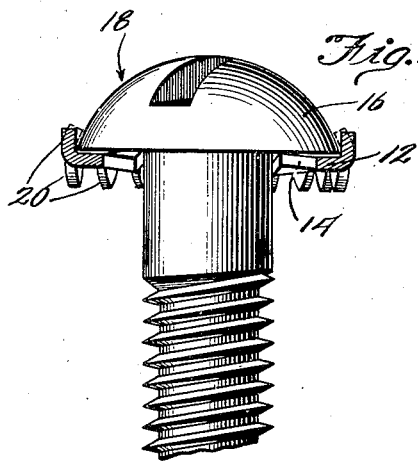
Figure 2 is a fragmentary side elevational view of a wood screw which is equipped with a lock washer of the type shown in Figure 1, said washer being shown in section in order to more clearly illustrate the structural characteristics thereof.
Figure 3:
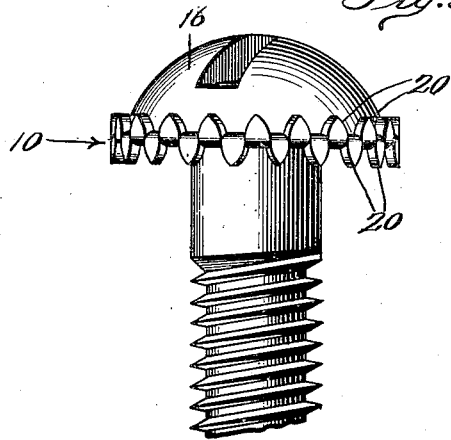
Figure 3 is a side elevational view similar to Figure 2 disclosing the washer in elevation as distinguished from the sectional disclosure in Figure 2.

Referring now to the drawing more in detail wherein like numerals have been employed to designate similar parts throughout the various figures, it will be seen that one embodiment of my invention comprises a washer of the type shown in Figures 1 to 3 inclusive, which I have designated generally by the numeral 10. This washer includes an annular body portion 12 of suitable flat spring stock and a plurality of internal spaced marginal prongs 14 which are warped or twisted out of the plane of the body portion 12 so as to present teeth for lockingly engaging the underside of the head 16 of a screw which I have designated generally by the numeral 18. These prongs 14 may be of any desired form which will effectively imbed themselves within a part, such as the screw head 16. Obviously the teeth 14 also serve to engage the adjacent surface of a work piece (not shown), but in view of the softness of material, such as wood, the degree to which the teeth 14 imbed themselves within the wood might not be sufficient to secure the washer against relative rotation with respect thereto.

In order to positively secure said washer against rotation with respect to the work piece, I provide a plurality of independent teeth or prongs 20 which are positioned along the outer margin of the body portion 12 and are disposed at substantially right angles with respect to said body portion. Attention is directed to the fact that these prongs 20 are alternately deflected in opposite directions out of the plane of the body portion and are pointed at their outer extremities so as to effectively imbed themselves within the surface of a work piece, such as a wood surface. By having the prongs 20 disposed on opposite sides of the body portion as shown in Figures 2 and 3, either side of the washer may be applied to the screw head 16 during the assemblying operation. Obviously this is an important factor in reducing the time necessary for assembly purposes, particularly when the washers must be selected from an indiscriminate mass thereof and applied in a large number of places in a minimum amount of time.

Figure 4:
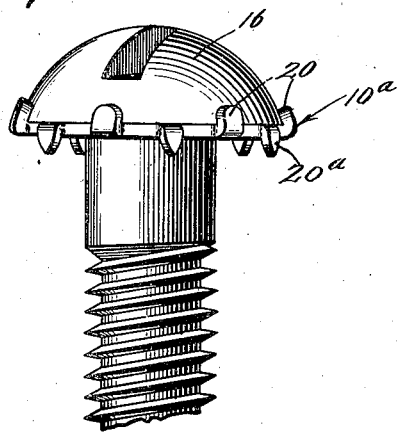
Figure 4 is a side elevational view similar to Figure 3 of a lock washer of modified form.

After the screw head 16 has been clamped against the washer so as to cause the lowermost prongs 20 to imbed themselves within the work piece, the uppermost prongs 20 may be bent inwardly as shown by the dotted lines in Figure 2 so as to clampingly engage the outer surface of the head 16. In this manner the washer and screw may be coupled together as a unit. In this connection attention is directed to the fact that if it is desirable to keep in stock a store of assembled screws and lock washers, it is only necessary to assemble the washer upon the screw and then bend the uppermost prongs 20 against the screw head as shown in Figures 2 and 4. In this manner I am able to provide a very convenient and practical screw and lock washer assembly which may be applied to a work piece with a minimum amount of effort on the part of the user. By clinching the prongs upon the screw head the washer is securely held in position upon the screw and at the same time the screw head may be rotated relative to the washer when it is being applied to a work piece.

In Figure 4 I have disclosed a modified washer construction which I have designated generally by the numeral 10a and this washer is similar to the washer 10 with the exception that I provide considerable space between the outer prongs. It will be seen that I provide prongs 20a which correspond in functional and structural characteristics to the prongs 20 previously described, and these prongs 20a are spaced a considerable distance apart. These prongs 20a are adapted to imbed themselves within the surface of a work piece when a clamping force is exerted axially of the washer in the manner described in connection with the structure shown in Figures 1 to 3 inclusive. Extending upwardly from the body portion of the washer 10a is a plurality of prongs 20b which are rounded at their outer extremities as distinguished from the sharp extremities of the prongs 20 and 20a. These prongs 20b are clamped against the head of the screw head 16 in the manner described in connection with Figure 2. This type of lock washer is particularly adaptable for preassembly devices and, of course, must be applied to the washer head in a predetermined manner, that is, with the prongs 20b uppermost. This is to be distinguished from the washer 10, either side of which may be applied to the screw head. In certain instances it may be desirable, from the standpoint of external appearance and the like, to employ the rounded prongs similar to the prongs 20b as distinguished from the sharp prongs 20a.

Figure 5:
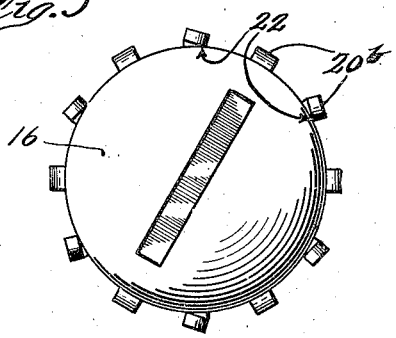
Figure 5 is a plan view of the device shown in Figure 4 with the upper marginal prongs warped so as to counteract retrograde movement of the screw head when the screw and washer assembly is secured upon a work piece.

In Figure 5 I have shown the manner in which these prongs 20b may be flexed in such a manner that one edge thereof, which I have designated by the numeral 22, is adapted to counteract retrograde movement of the screw head with respect to the washer when the assembly is applied to the work piece.

Having thus described my invention, what I claim as new and desire to secure by Letters Patent is:

1. A lock washer including an intermediate annular body portion of unbroken annular continuity, a plurality of work engaging teeth provided along the inner margin of said body portion for lockingly engaging the clamping surface of a member such as a screw head, and a plurality of work engaging teeth along the outer margin of said body portion projecting in opposite directions out of the plane thereof, whereby, when either side of the washer is applied to the work piece, outer teeth thereof will be in position to be forced into said work piece for securing the washer against rotation with respect thereto.

2. A lock washer including an intermediate annular body portion of unbroken continuity, a plurality of work engaging teeth provided along the inner margin thereof for lockingly engaging the clamping surface of a member such as a screw head, and a plurality of sharp work engaging teeth warped in opposite directions out of the plane of the washer body along the outer margin thereof.

3. A lock washer including an annular body portion, a plurality of work engaging teeth positioned along the inner margin thereof for lockingly engaging a screw head, a plurality of work engaging teeth positioned along the outer margin of said body portion projecting out of the plane thereof for lockingly engaging a work piece, and means projecting in an opposite direction out of the plane of the body portion adapted to be crimped against said screw head for securing said washer against axial movement with respect thereto and enabling rotation of the screw with respect to the washer during the clamping of said screw thereagainst.

4. The combination with a screw having a head, a lock washer positioned adjacent said head, said washer including an annular body portion formed with a plurality of internal marginal teeth for lockingly engaging said screw head, and means positioned along the outer margin of said body portion for securing said washer to the screw head and enabling rotation of the screw with respect to the washer during the clamping of said screw thereagainst.

5. A lock washer including an annular body portion, a plurality of working engaging teeth provided along the inner margin thereof for lockingly engaging the clamping surface of a rotary clamping element, such as a screw head or nut, and a plurality of work engaging teeth oppositely positioned out of the plane of the washer body along the outer margin thereof, said teeth being spaced sufficiently from the washer axis to prevent interference of said teeth with the clamping surface when said surface is tightened against the inner teeth.

6. A lock washer including an annular body portion, a plurality of work engaging teeth provided along the inner margin of said body portion for lockingly engaging the clamping surface of a rotary clamping element such as a screw head or nut, and a plurality of work engaging teeth along the outer margin of said body projecting in opposite directions out of the plane thereof, whereby, when either side of the washer is applied to the work piece, certain of said outer teeth will imbed themselves within the surface of said work piece and the other outer teeth will be free from engagement with the above mentioned clamping surface when said washer is clamped in position.

In witness whereof, I have hereunto subscribed my name.

CARL G. OLSON.